US008621366B1

(12) United States Patent
Sampath

(10) Patent No.: US 8,621,366 B1
(45) Date of Patent: Dec. 31, 2013

(54) SELF-CREATION OF COMIC STRIPS IN SOCIAL NETWORKS AND OTHER COMMUNICATIONS

(75) Inventor: Satish Kumar Sampath, London (GB)

(73) Assignee: Google Inc., Mountain View, CA (US)

( * ) Notice: Subject to any disclaimer, the term of this patent is extended or adjusted under 35 U.S.C. 154(b) by 531 days.

(21) Appl. No.: 12/706,151

(22) Filed: Feb. 16, 2010

(51) Int. Cl.
*G06F 3/00* (2006.01)

(52) U.S. Cl.
USPC ........................................................ 715/751

(58) Field of Classification Search
USPC ................................ 715/751, 752, 753, 758
See application file for complete search history.

(56) References Cited

U.S. PATENT DOCUMENTS 6,069,622 A * 5/2000 Kurlander .................... 715/753
6,130,938 A 10/2000 Erb
6,192,119 B1 2/2001 Wilson
6,697,478 B1 2/2004 Meldrum et al.
6,754,322 B1 6/2004 Bushnell
7,106,848 B1 9/2006 Barlow et al.
7,366,990 B2 4/2008 Pitroda
7,555,110 B2 6/2009 Dolan et al.
7,610,287 B1 10/2009 Dean et al.
7,742,468 B2 6/2010 Vagelos
8,301,999 B2 * 10/2012 Olson .......................... 715/246
2002/0137490 A1 9/2002 Gallant
2002/0143874 A1 10/2002 Marquette et al.
2004/0258220 A1 12/2004 Levine et al.
2005/0152521 A1 7/2005 Liljestrand
2006/0026288 A1 2/2006 Acharya et al.
2006/0077957 A1 4/2006 Reddy et al.
2006/0206604 A1 9/2006 O'Neil et al.
2007/0002057 A1 * 1/2007 Danzig et al. ................ 345/473
2007/0127631 A1 6/2007 Difiglia
2007/0171898 A1 7/2007 Salva
2007/0173236 A1 7/2007 Vishwanathan et al.
2007/0248077 A1 10/2007 Mahle, Jr. et al.
2008/0056475 A1 3/2008 Brannick et al.
2008/0192656 A1 8/2008 Vagelos
2011/0098156 A1 4/2011 Ng et al.
2011/0209198 A1 * 8/2011 Blattner et al. .................. 726/3

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.
Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.

(Continued)

*Primary Examiner* — Thanh Vu
(74) *Attorney, Agent, or Firm* — Patent Law Works LLP

(57) ABSTRACT

Communications to be shared on social networks and other electronic modes of communication are presented in comic strip form. The comic strips are created with a simplified user interface and are formatted to be well-suited for display on a selected social network or other electronic facility. The comic strips are displayed in an embedded form directly in the social network or other facility, without the need for a user to go to a separate site to view the comic strip.

21 Claims, 7 Drawing Sheets

(56) References Cited

OTHER PUBLICATIONS

AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.
Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Murchu et al., "Online Social and Business Networking Communities," Digital Enterprise Research Institute DERI Technical Report, National University of Ireland, Aug. 11, 2004, 22 pgs.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
Ring Central, Inc., Internet, retrieved at http://www.ringcentral.com, Apr. 19, 2007, 1 pg.
Singh et al., "Cinema: Columbia InterNet Extensible Multimedia Architecture," Department of Computer Science, Columbia University, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

SELF-CREATION OF COMIC STRIPS IN SOCIAL NETWORKS AND OTHER COMMUNICATIONS

BACKGROUND

1. Field of the Invention

This invention relates to electronic communications.

2. Description of the Related Art

The sharing of information among users of social networks has developed into a worldwide phenomenon, supported by various different social network facilities. Millions of text, picture, video and audio communications are sent and received on a daily basis among users of such networks. Many users enjoy sharing jokes and other humorous material with their social network contacts.

Conventionally, a user shares humorous material with social network contacts in a native format or by a link to a source, such as a web page. Advances in social networks have allowed not only text, but pictures, hypertext links and even embedded videos to exist within a user interface of a social network facility so as to enhance the overall user experience of the social network.

Presently, a user who has a funny item, such as a joke, to share with others does not have a way to do so readily other than by plain text. Now that social network interfaces support audio, pictures, animation and video, plain text messages tend to not be as noticed by other users. Numerous web sites allow end users to easily create their own comic strips, which allow text to be provided with additional visual context, but the strips thus created are not well adapted to be embedded within social network interfaces. Also lacking is the ability to directly create and share jokes as comic strips directly from the social network websites, thus the users today must go to a different website to create any strips they need and then import such creations into their social network websites.

As a result of these challenges, there remains a need for a system to allow users of social networks and other electronic communication systems to readily create and read comic strips directly from the corresponding social network's user interface.

SUMMARY

Various systems, methods and software tools, in various embodiments, allow an end user to easily create and distribute jokes and other written communications in the form of a comic strip to other users of a social network.

Depending on the selected destination for a comic strip, e.g., a social network page, a user's web page or a mobile messaging device, the comic strip is formatted in an appropriate manner before being posted to its destination. The final content that gets posted to the destination may be the full comic strip image and related media or just a link to the strip, depending on the destination's capabilities.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the present invention provide systems, methods, and computer-readable storage media for creating comic strips and publishing them in social network facilities and other modes of electronic communication. Just as in human physical interaction, users of social networks and other forms of electronic communication often wish to share a funny moment or a joke with friends and acquaintances. Plain text is a difficult way to do this, as both primary content and context need to be provided by written language alone. Comic strips help provide non-textual flavor to such communications and in many instances can make a communication more enjoyable than if it were limited to text alone, for the same reason that emoticons and backgrounds have found such prevalence in electronic communications. As described below, comic strips are presented in an embedded manner that is readily viewed in line with other social network content and supports social network functions such as voting, sharing and the like. While the discussion below is phrased in terms of social networks per se, comic strips can likewise be created and distributed in an embedded fashion in similar communications such as electronic mail (e.g., the GMail facility provided by Google Inc.), instant messaging (e.g., the Google Talk facility provided by Google Inc.) and mobile device text messaging. As a result, developed comic strips can be shared and reused on a variety of different modes of electronic communication. Thus, the collection of comic strips a user makes available to the public easily grows, and the increased access is encouraged by the reduction in integration costs that have been historically faced.

Figure 1:
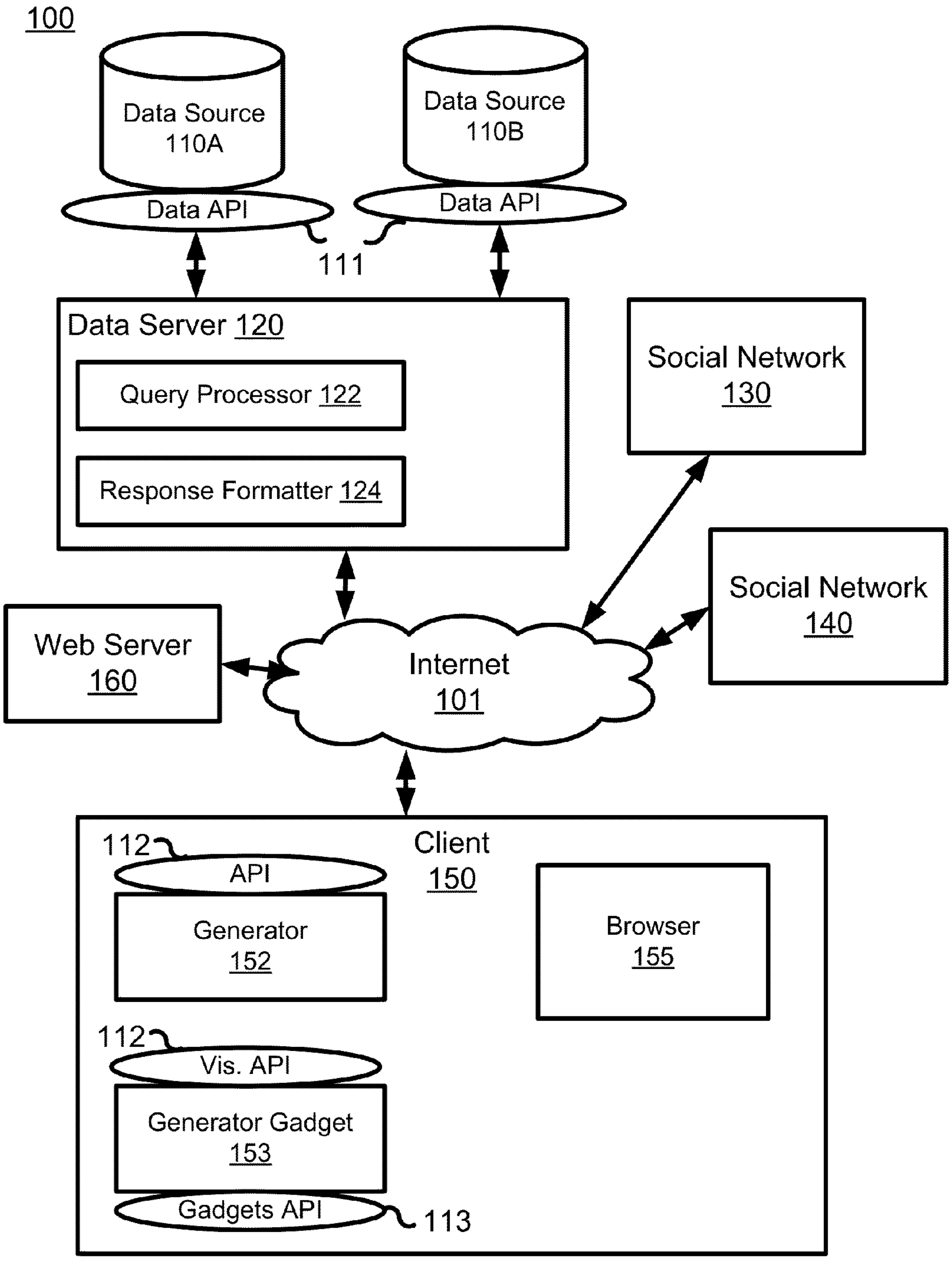
FIG. 1 is a high-level block diagram of a computing environment in accordance with one embodiment.

FIG. 1 is an illustration of a computing environment 100 in accordance with one embodiment of the invention. The computing environment 100 includes a variety of data sources 110A, 110B, a data server 120, social networks 130 and 140, a user's own web server 160, and a client 150 connected via the Internet 101.

The data sources 110A, 110B are data stores that provide themes and other comic strip components to the user. The data sources 110A, 110B can include but are not limited to a service that makes comic book character images (which can range from simple line drawings to animated audiovisual avatars) available to users. While two such data sources 110A and 110B are shown, any number can be used as desired or as appropriate for a particular environment 100. For example, data source 110A in one embodiment provides a standard default set of comic characters, while data source 110B is a third party-provided premium set of characters. Data APIs are shown as being associated with each of sources 110A and 110B to allow a variety of data sources to be adapted for use in environment 100. These APIs may be omitted in implementations that use only fully integrated sources of comic strip components.

The data server 120 includes query processor 122 and a response formatter 124. When generator 152 sends a request for data from data source 110A, the server processes the query using the query processor 122 to format the request according to the data API 111 of the data source 110A. The data source 110A responds with the requested data, which is then formatted by the response formatter 124 before being sent to the generator 152. Similarly, a generator gadget 153 uses both the API 112 and the gadgets API 113 to format requests for data from data sources 110A, 110B. Through the data API 111, the data from data sources 110A, 110B can be accessed for use by the generator 152. Although FIG. 1 and the above description include a single data server 120 serving many data sources through data API 111, other system architectures are also possible. For example, in FIG. 1, the data server 120, the query processor 122, the response formatter 124, and the data API 111 may be implemented together as a single entity over a single data source 110A. Other such single entities may be implemented for other single data sources 110B. Likewise, generator 152 is in some implementations not actually an application running on client 150, but merely a user interface presented on client 150 of a program operating on another computer networked to client 150 via Internet 101 and browser 155.

Social networks 130 and 140 represent social networking facilities such as the orkut social network facility provided by Google Inc. More than one such network is illustrated because in one embodiment, environment 100 allows creation of comic strips for multiple social networks. As noted above, facilities that are not thought of as social networks per se, such as Gmail and Google Talk, are other examples of facilities on which comic strips can be created and distributed as described herein.

In addition to use with social networks, comic strips created in environment 100 are in some embodiments made available for a user to post on the user's own web site, for instance a web site provided via web server 160.

Figure 2:
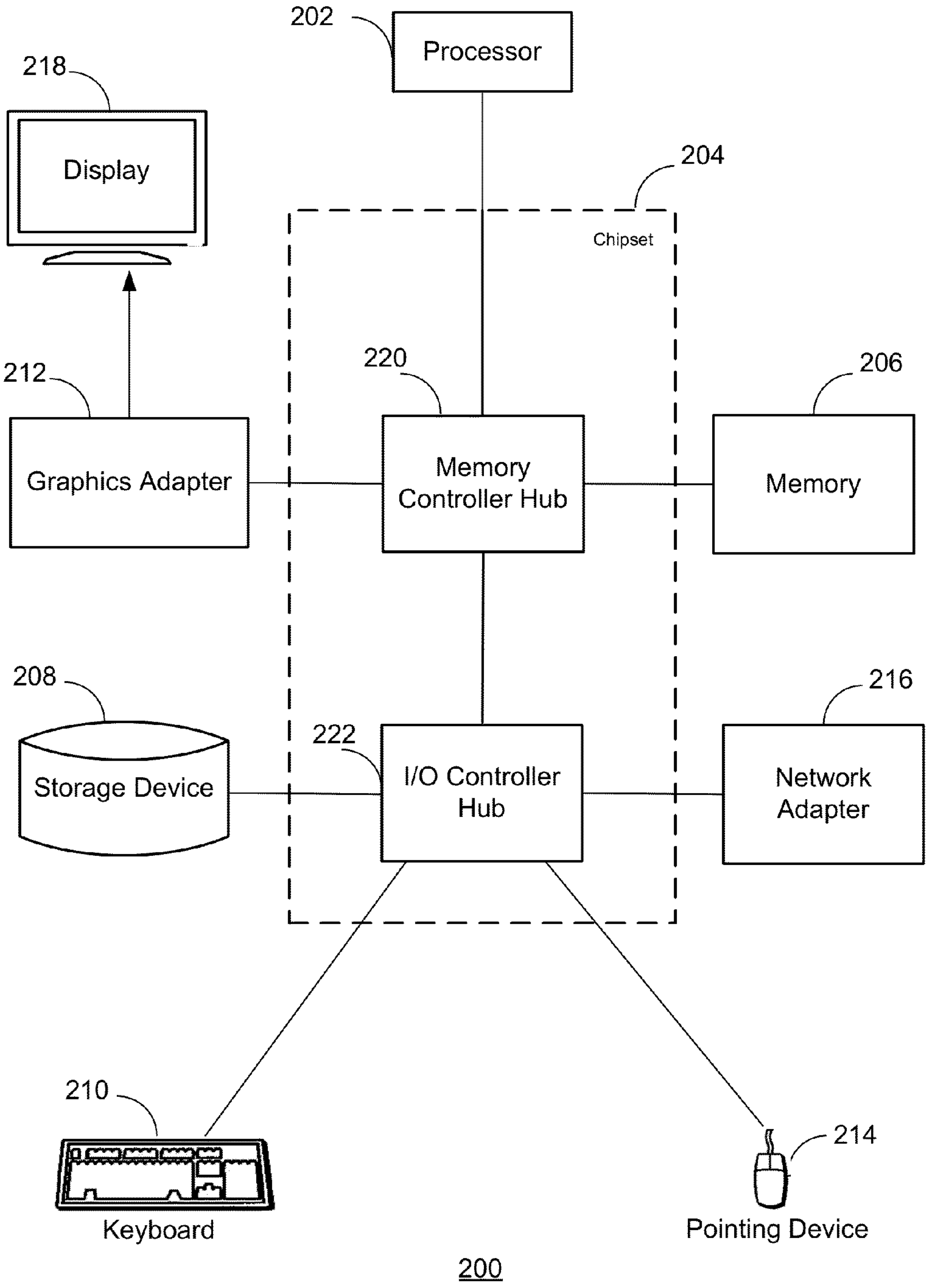
FIG. 2 is a high-level block diagram illustrating an example of a computer for use as a server and/or client.

FIG. 2 is a high-level block diagram illustrating an example of a computer 200 for use as a data server 120, a web server 160, and/or a client 150. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disc read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the Internet 101. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the components of FIG. 1 vary depending upon the embodiment and the processing power used by the entity. For example, a client 150 that is a mobile telephone typically has limited processing power, a small display 218, and might lack a pointing device 214. The data server 120, in contrast, may comprise multiple blade servers working together to provide the functionality described herein.

Creating Comic Strips

Figure 3:
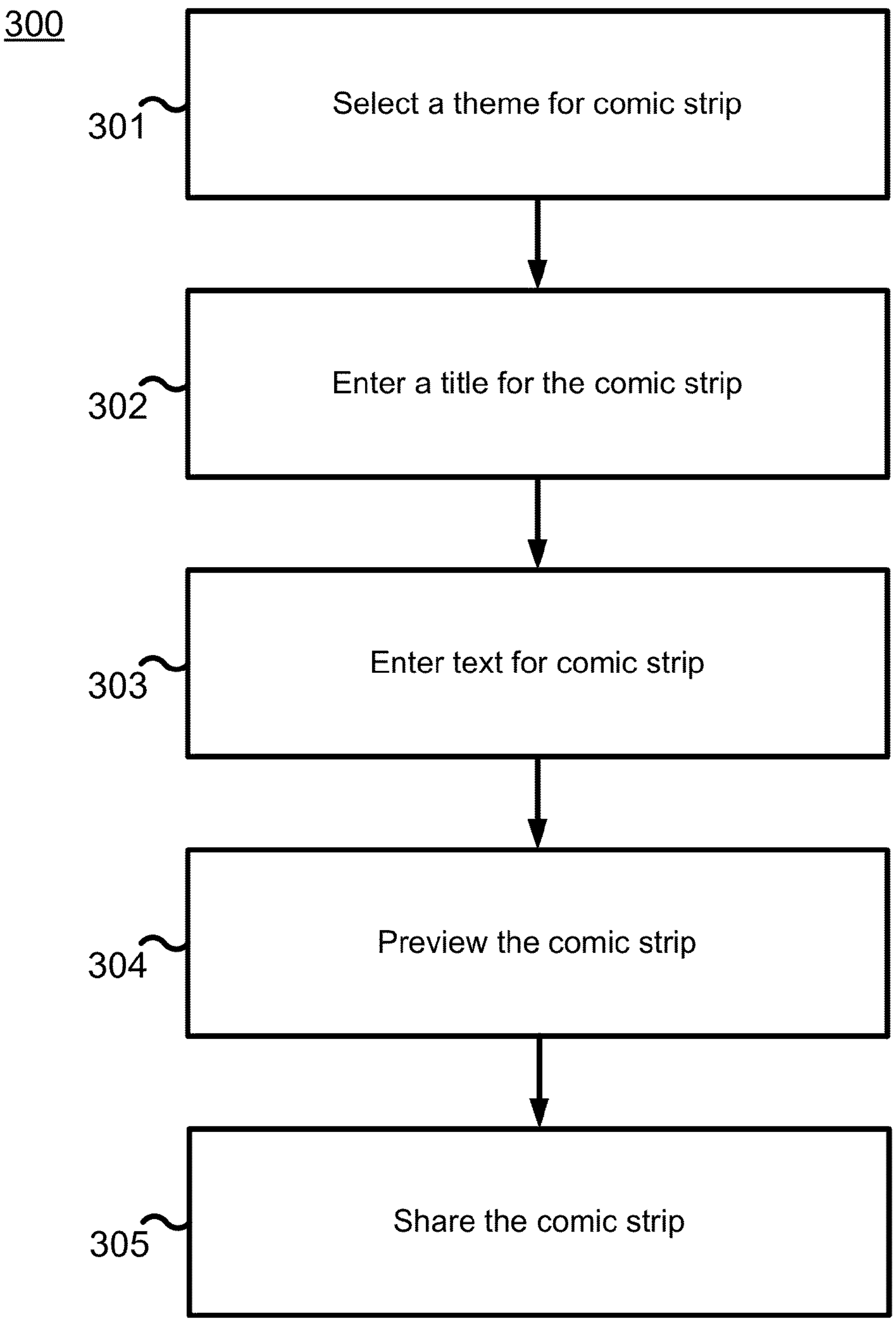
FIG. 3 is a flow chart illustrating a method of creating a comic strip, in accordance with one embodiment.

FIG. 3 is a flow chart illustrating an example method 300 of creating a comic strip. In step 301, a user selects a theme for the comic strip. In one embodiment, a default theme includes two characters, one male and one female, both depicted via black-and-white line drawings. Other themes include characters of various ages, appearances and colors. For instance, in one embodiment a theme includes only children, or teenagers. Another theme includes robots. Custom themes are also available, with photographs and user-supplied images or drawings being used for the characters.

In step 302, the user enters a title for the comic strip. In one embodiment, the title entry is accomplished via a free text entry box with character length limitations so as to provide a visually pleasing title for the resulting comic strip.

In step 303, the user enters the actual text for the comic strip. Again, in one implementation free text entry is allowed with length limitation provided to ensure the aesthetics of the resulting comic strip. In some embodiments, text characteristics such as font style and size are also user-selectable.

In certain embodiments, selection of a theme, entry of a title and entry of content text is automatically assisted by inferred contextual information. For example, in one embodiment a user may receive a plain text joke as an email from a friend. Emails containing jokes have many typical elements. Often, they will contain the word "joke" or "funny" and have a standard format, such as, "A bear walks into a bar. The bartender says . . . , and the bear replies . . . ." Conventional contextual processing is used in such an embodiment to determine that the email may convey a joke in this format, and as a result when the friend is composing the email, in this embodiment a user interface display appears asking the friend if she would like to send a portion of her message in comic strip form. If she replies in the affirmative, the embodiment automatically selects a title (such as "Bear Joke") and proposes a theme and content for the comic strip. In another embodiment, the user who receives the email from the friend is asked if he would like to forward the joke on to others in the form of a comic strip, and the theme, title and content are again automatically proposed for the user.

In step 304, the user previews the comic strip that has been created for proofreading and to ensure that it has the desired appearance.

In step 305, the user instructs environment 100 to share the comic strip. Typically, a social network user will share a comic strip with the user's social network graph, but in some implementations other variations will be desired. For instance, a user seeking to gain a wider following may publish a comic strip to a web site via web server 160; a user seeking commercial gain may attempt to monetize such a site through access limitations or associated advertising.

Figure 5:
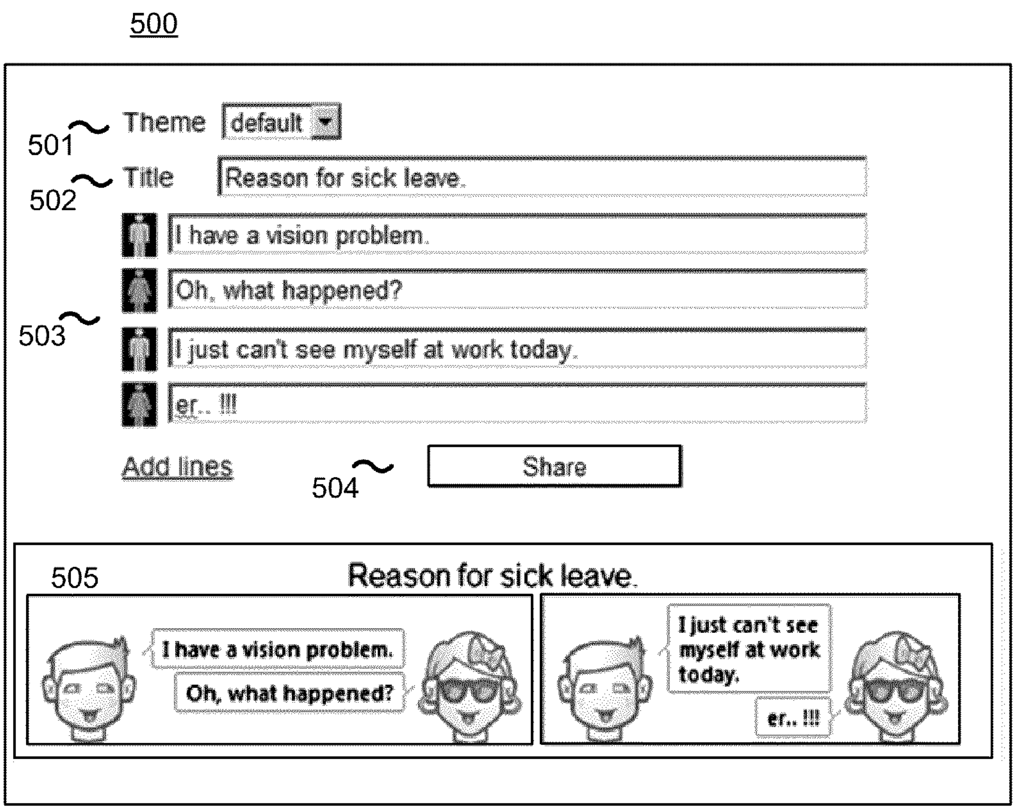
FIG. 5 is a user interface screen for creation of a comic strip, in accordance with one embodiment.

Referring now to FIG. 5, a user interface 500 for comic strip generation is shown. Interface 500 provides a drop-down theme selection box 501. In one embodiment, a default theme is provided along with several other predetermined themes. In another embodiment, a custom theme can be selected, which the user can create using a separate interface (not shown) to select a group of images for a customized theme that the user may wish to use over and over again.

A title text entry box 502 permits the user to enter a title for the comic strip. In one embodiment, the box does not allow more text to be entered than will fit in the box, so as to automatically limit the length of the title for aesthetic purposes. Likewise, a series of text entry boxes 503 are provided to allow the text of the comic strip to be added; icons indicate which character is associated with each line of text. While FIG. 5 shows only two characters, in different embodiments any number of characters, and different types of characters, are used. In some embodiments, a dropdown selection tool is provided for the user to add and select characters. As illustrated in FIG. 5, in some embodiments the user is also given an option to add additional lines of text as desired.

A preview area 505 allows the user to proof read the comic strip and review its aesthetics as the user is creating the strip. Once the user is satisfied with the way the comic strip looks, a "share" button 504 instructs environment 100 to push the comic strip out to the desired location. In one implementation a destination location is implicit based on where the comic strip is created, so a comic strip created using a social application in a user's orkut profile is posted in the orkut facility while a strip created using a social application in a user's Facebook profile would be posted in the Facebook social networking facility. In other embodiments, the user is provided with a choice of ways to share a comic strip, such as illustrated in the sharing choices shown in FIG. 7, discussed below.

Sharing Comic Strips

One perceived problem with current mechanisms for creating and sharing comic strips in social networks is that a user needs to navigate away from his primary page on the network to create the comic strip, and in some cases the user's contacts on a social network need to navigate away from their primary page on the network in order to view and enjoy the comic strip. For many social network participants, particularly those who are not very close to the comic strip's creator, it will not be considered worth the effort to navigate to another page and they simply will not bother to view the strip. To increase ease of access to comic strips, environment 100 is configured to allow a created comic strip to appear along with other text, pictures, icons and the like directly in a social network user's primary page. This is accomplished by conforming the comic strip to the specifications of the social network on which it is to be shared. For example, the orkut social network is particularly well suited to images of relatively modest height (e.g., 80 pixels) but of substantial width. Thus, in one embodiment response formatter 124 of data server 120 formats the comic strip to be not very high but substantially wide in response to query processor 122 receiving a request to share the comic strip in the orkut social network. The characters used in the comic strip, as well as the drawings, fonts and text formatting are in certain embodiments chosen to fit the size constraints imposed by the social network. Fonts and drawings used for rendering a strip in the orkut social network thus may differ substantially from those used to render the strip in the Facebook social network or on other sites. In some cases, even the rendered format may differ. For instance, Facebook currently allows wide flash animations but not wide static images, while such a distinction is not present in orkut. Accordingly, a comic strip rendered for Orkut as a static image may be rendered as a flash animation for Facebook in order to make best use of the available display size.

Figure 4:
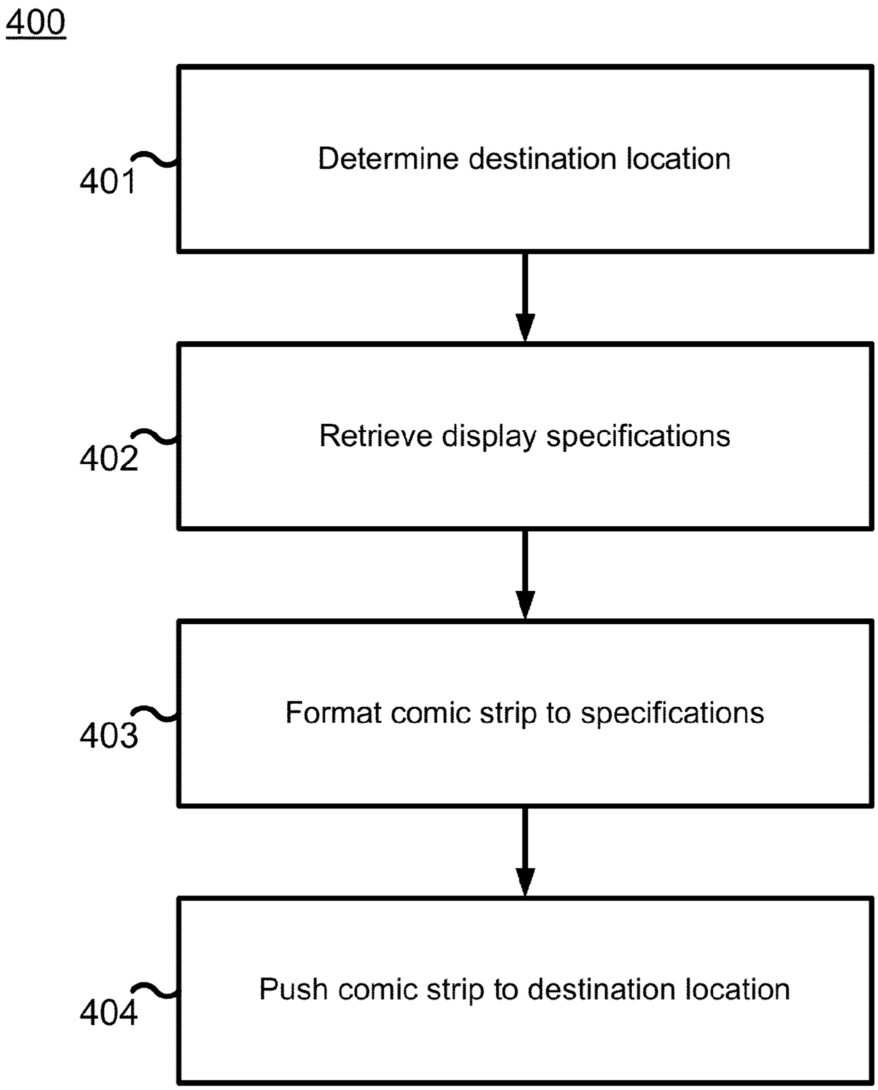
FIG. 4 is a flow chart illustrating a method of publishing a comic strip, in accordance with one embodiment.

Referring now to FIG. 4, once a user indicates that a comic strip is to be shared, the first step 401 is to determine the destination location. As previously mentioned, the strip may be shared to a social network or the user's own web site. In some embodiments comic strips may be sent to other destinations as well. For instance, in certain embodiments various modes of communication can be specified, ranging from mobile instant messaging to electronic mail. A typical implementation uses as a default the mode of communication from which the user created the comic strip. For example, an orkut user may be provided the user interface of FIG. 5 as discussed above, and in that case sharing to the user's orkut social network graph would be a default destination. In certain embodiments, upon activating the "share" button 504 the user is given an option to select a desired destination. In other embodiments, interface settings (e.g., via social network profiles) allow the user to determine a destination for comic strips that are created.

In step 402, environment 100 determines the display specifications that apply to the selected destination. Display rendering for various modes of communication, such as instant messaging and web pages, is vastly different. Display rendering even differs substantially among various social networks, as noted above. A web page might be expected to have available a rectangular display area that is nearly square, allowing for multiple rows of a comic strip to be displayed. The orkut social network facility, on the other hand, with its limited vertical space, is better suited to displaying a comic strip in a single horizontal row, perhaps in a scrolling "ticker tape" manner depending on the number of frames in the comic strip.

In step 403, the comic strip is formatted according to the specifications of its destination. To give a particular example, in one embodiment, the comic strip is formatted to provide a single row of frames if it is to be displayed on the orkut social network facility; a three column by as many rows as needed format if it is to be sent to a web page, a single frame that is click-advanced to the next frame if sent to a mobile network or other destinations with less horizontal space available. For some destinations, the most appropriate format may be simply a link to a website, if such device provides better formatting for comic strips via its web browser (e.g., a device having a messaging mode that supports only plain text and linking for messages as opposed to having more extensive HTML or rich text support). Once the comic strip is fully formatted, it is pushed 404 to the selected destination location. In a typical implementation, this is done by posting the title of the comic strip and a link to the image of the comic strip on a social network. Typically, the social network will download and possibly cache the image when a user views the strip, at which point data server 120, for instance, will dynamically generate and serve the image of the comic strip. In some instances, the social network will further resize the image to fit within the social network's image constraints. In certain environments, rather than posting a link to the image the step 404 includes posting the action image data so that data server 120 need not even be called once a social network user views the comic strip. In certain environments, such as the current Twitter interface, the title of the comic strip and a link to a web page where the comic strip can be found is provided.

Presentation of Comic Strips

Figure 6:
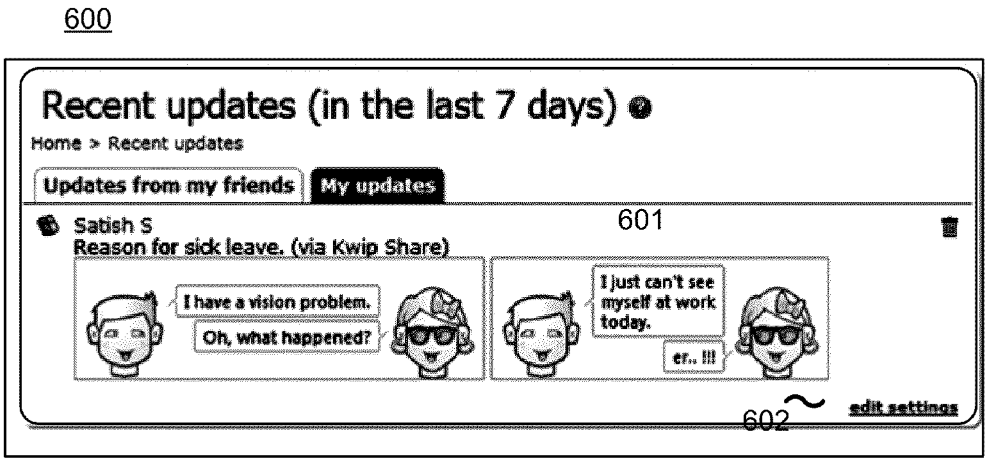
FIG. 6 is a user interface of a social network facility illustrating a comic strip, in accordance with one embodiment.

FIG. 6 illustrates how a comic strip is displayed in a user's personal stream in the orkut social network facility. A recent updates screen 600 includes, in this instance, a comic strip 601 that the user has created. The comic strip appears in its complete form embedded in the recent updates screen 600 of the social network facility. The user of the social network does not need to link to any other site, or take any additional action, to see the full content of the comic strip. In this embodiment, the standard "edit settings" link 602 of the social network appears with the comic strip to allow the user standard access to the conventional social network controls as would normally be the case. However, the user is shown the comic strip immediately and automatically, without having to access any of these controls or take any further action. The comic strip appears just as any other embedded content, such as a message from a friend, would appear.

Figure 7:
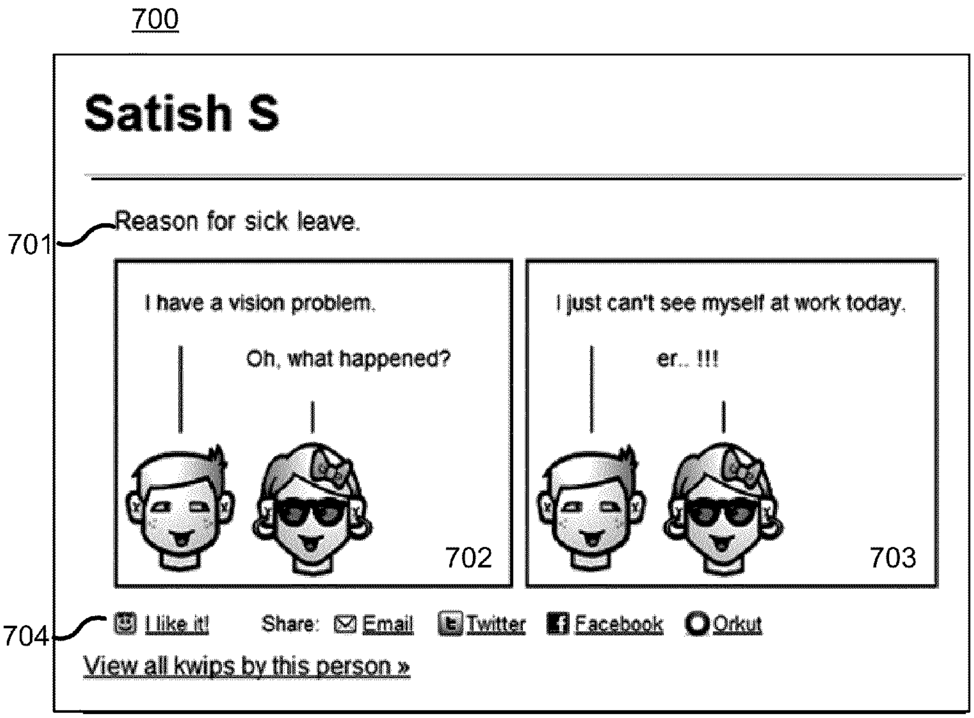
FIG. 7 is a user interface screen illustrating a web page with a published comic strip, in accordance with one embodiment.

FIG. 7 illustrates the same comic strip displayed on a web page 700. In this instance, the comic strip is formatted differently than it was on the social network, as more vertical space is available. For example, the text appears above, rather than between the characters in frames 702 and 703, and frames 702 and 703 have an aspect ratio that is taller than their counterparts from FIG. 6. Furthermore, the web page 700 affords inclusion of various controls 704 to allow viewers to vote that they like the comic strip, as well as to share it via email or various social networking facilities.

In various embodiments, conventional social network features such as tagging, keywords, searching, saving, and location-aware content are all supported for comic strips posted on social network facilities as described herein. For example, a visitor to London's famous Eye (the Millennium Wheel) may get access to comic strips in her social network graph that relate to the Eye.

Aside from humor, such comic strips are also usable for education, for instance in summarizing a real-time conversation between two political leaders as it is happening. By posting such a comic strip on a social network facility such as a social network blog or tweet, others may more readily follow the flow of the conversation than if it had been summarized in plain text.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method of electronically creating comic strip communications, the method comprising:

receiving a text input from a first user;

selecting, from a database server, a theme for a comic strip based on the text input, wherein selecting the theme includes contextually processing;

entering a title for the comic strip via a user interface in at least one of a computer-implemented social network facility, an electronic mail facility, an instant messaging facility, a texting facility, and an electronic communications facility;

associating textual content for the comic strip from the text input with at least two characters, the textual content being part of a conversation between the at least two characters;

displaying, via the user interface, a preview of the comic strip;

determining display specifications that apply to a destination location;

formatting the comic strip to conform to the display specifications of the destination location;

directing, via the user interface, that the comic strip be posted in the destination location for a second user including embedding the comic strip in a personal stream associated with the second user in the computer-implemented social network facility and allowing the second user to access and control the comic strip in the personal stream; and receiving a request from the second user to share the comic strip with a third user.

2. The method of claim 1, wherein selecting the theme includes selecting among a plurality of characters.

3. The method of claim 1, wherein selecting the theme includes selecting a user-customized theme.

4. The method of claim 3, wherein selecting the user-customized theme further comprises using another user interface to select a group of images for the user-customized theme that the first user can use repeatedly.

5. The method of claim 1, wherein directing, via the user interface, that the comic strip be posted in the destination location for the second user to read further comprises:

determining the destination location to post the comic strip;

pushing the comic strip to the destination location for display to the second user; and wherein the destination location includes at least one of a social network page, the second user's web page, and a mobile messaging device.

6. The method of claim 5, wherein the destination location is implicit based on where the comic strip is created.

7. The method of claim 5, wherein the destination location is determined based on a user selection.

8. The method of claim 1, wherein formatting the comic strip to conform to the display specifications of the destination location comprises at least one of resizing the comic strip and changing a format of the comic strip.

9. The method of claim 1, wherein the comic strip includes a summary of a real-time conversation that can be used for education.

10. The method of claim 1, further comprising:

inferring characteristics from the text input; and determining to convert a portion of the text input into the comic strip based on the inferred characteristics.

11. A system for electronically creating comic strip communications, the system comprising:

a database server configured to store data corresponding to themes for a comic strip; and a first computing subsystem configured to receive a text input from a first user and provide a user interface in at least one of a computer-implemented social network facility, an electronic mail facility, an instant messaging facility, a texting facility, and an electronic communications facility, the user interface including a theme selection portion to retrieve a selected theme from the database server based on the text input, a title entry portion for user entry of a title for the comic strip, a textual content entry portion for associating textual content for the comic strip from the text input with at least two characters, the textual content being part of a conversation between the at least two characters, a comic strip preview portion to display the comic strip, the display including determining display specifications that apply to a destination location and formatting the comic strip to conform to the display specifications of the destination location, and a user control to post the comic strip in the destination location for a second user including embedding the comic strip in a personal stream associated with the second user in the computer-implemented social network facility and allowing the second user to access and control the comic strip in the personal stream.

12. The system of claim 11, further comprising a client computer in communication with the first computing subsystem, the client computer configured to display the user interface.

13. A non-transitory computer-readable storage medium containing executable computer program instructions for creating comic strip communications, the computer program instructions comprising:

instructions to receive a text input from a first user;

instructions to allow retrieval, from a database, of a theme for a comic strip based on the text input;

instructions to allow user entry of a title for the comic strip, via a user interface, in at least one of a computer-implemented social network facility, an electronic mail facility, an instant messaging facility, a texting facility, and an electronic communications facility;

instructions to associate textual content for the comic strip from the text input with at least two characters, the textual content being part of a conversation between the at least two characters;

instructions to display, via the user interface, a preview of the comic strip;

instructions to determine display specifications that apply to a destination location;

instructions to format the comic strip to conform to the display specifications of the destination location;

instructions to post the comic strip in the destination location for a second user including embedding the comic strip in a personal stream associated with the second user in the computer-implemented social network facility and allowing the second user to access and control the comic strip in the personal stream; and responsive to a request from the second user, instructions to share the comic strip with a third user.

14. The non-transitory computer-readable storage medium of claim 13, wherein the theme is selected by the first user from a plurality of themes stored in the database.

15. The non-transitory computer-readable storage medium of claim 13, wherein the theme is a user-customized theme.

16. A method of electronically creating comic strip communications, the method comprising:

scanning an electronic message for characteristics suitable for the comic strip communications;

selecting, from a database server, a theme for a comic strip responsive to the characteristics;

automatically proposing a title for the comic strip, via a user interface, responsive to the characteristics;

automatically proposing textual content for the comic strip, via the user interface, responsive to the characteristics;

associating the textual content for the comic strip with at least two characters, the textual content being part of a conversation between the at least two characters;

displaying a preview of the comic strip via the user interface to allow a first user's review and editing of the comic strip;

determining display specifications that apply to a destination location;

formatting the comic strip to conform to the display specifications of the destination location;

directing, via the user interface, that the comic strip be posted in the destination location for a second user including embedding the comic strip in a personal stream associated with the second user in a computer-implemented social network facility and allowing the second user to access and control the comic strip in the personal stream; and receiving, via the user interface, a request from the second user that the comic strip be posted for a third user to read.

17. The method of claim 16, wherein directing, via the user interface, that the comic strip be posted in the destination location for the second user to read further comprises:

determining the destination location to post the comic strip;

pushing the comic strip to the destination location for display to the second user; and wherein the destination location includes at least one of a social network page, a user's web page, a mobile messaging device.

18. A system for electronically creating comic strip communications, the system comprising:

a database server configured to store data corresponding to themes for a comic strip; and a first computing subsystem configured to scan an electronic message for characteristics suitable for the comic strip communications, select, from the database server, a theme for the comic strip responsive to the characteristics, automatically propose a title for the comic strip, via a user interface, responsive to the characteristics, automatically propose textual content for the comic strip, via the user interface, responsive to the characteristics, associate the textual content for the comic strip with at least two characters, the textual content being part of a conversation between the at least two characters, display a preview of the comic strip via the user interface to allow a first user's review and editing of the comic strip, determine display specifications that apply to a destination location, format the comic strip to conform to the display specifications of the destination location, direct, via the user interface, that the comic strip be posted in the destination location for a second user including embedding the comic strip in a personal stream associated with the second user in a computer-implemented social network facility and allowing the second user to access and control the comic strip in the personal stream, and receive, via the user interface, a request from the second user that the comic strip be posted for a third user to read.

19. The system of claim 18, wherein directing, via the user interface, that the comic strip be posted in the destination location for the second user to read further comprises:

determining the destination location to post the comic strip;

pushing the comic strip to the destination location for display to the second user; and wherein the destination location includes at least one of a social network page, a user's web page, a mobile messaging device.

20. A non-transitory computer-readable storage medium containing executable computer program instructions for creating comic strip communications, the computer program instructions comprising:

instructions to scan an electronic message for characteristics suitable for the comic strip communications;

instructions to select, from a database server, a theme for a comic strip responsive to the characteristics;

instructions to automatically propose a title for the comic strip, via a user interface, responsive to the characteristics;

instructions to automatically propose textual content for the comic strip, via the user interface, responsive to the characteristics;

instructions to associate the textual content for the comic strip with at least two characters, the textual content being part of a conversation between the at least two characters;

instructions to display a preview of the comic strip via the user interface to allow a first user's review and editing of the comic strip;

instructions to determine display specifications that apply to a destination location;

instructions to format the comic strip to conform to the display specifications of the destination location;

instructions to post the comic strip, via the user interface, in the destination location for a second user including embedding the comic strip in a personal stream associated with the second user in a computer-implemented social network facility and allowing the second user to access and control the comic strip in the personal stream; and responsive to a request from the second user, instructions to post the comic strip, via the interface, for a third user to read.

21. The non-transitory computer-readable storage medium of claim 20, wherein the instructions to post the comic strip in the destination location further comprise:

instructions to determine the destination location to post the comic strip;

instructions to push the comic strip to the destination location for display to the second user; and wherein the destination location includes at least one of a social network page, a user's web page, and a mobile messaging device.

* * * * *